(12) United States Patent
Chen et al.

(10) Patent No.: US 8,495,602 B2
(45) Date of Patent: Jul. 23, 2013

(54) SHADER COMPILE SYSTEM AND METHOD

(75) Inventors: Lin Chen, San Diego, CA (US);
Guofang Jiao, San Diego, CA (US);
Chihong Zhang, San Diego, CA (US);
Junhong Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1143 days.

(21) Appl. No.: 11/864,563

(22) Filed: Sep. 28, 2007

(65) Prior Publication Data
US 2009/0089763 A1 Apr. 2, 2009

(51) Int. Cl.
*G06F 9/45* (2006.01)

(52) U.S. Cl.
USPC ........... 717/149; 717/140; 717/143; 717/150; 717/151; 345/506; 712/35; 712/222; 711/105

(58) Field of Classification Search
None
See application file for complete search history.

(56) References Cited

U.S. PATENT DOCUMENTS

| | | | | |
|---|---|---|---|---|
| 6,571,328 | B2* | 5/2003 | Liao et al. | 712/35 |
| 6,844,880 | B1 | 1/2005 | Lindholm et al. | |
| 7,167,972 | B2* | 1/2007 | Barlow et al. | 712/222 |
| 7,456,838 | B1* | 11/2008 | Brown et al. | 345/522 |
| 7,719,545 | B1* | 5/2010 | Brown et al. | 345/620 |
| 8,154,554 | B1* | 4/2012 | Brown et al. | 345/522 |
| 2002/0130874 | A1* | 9/2002 | Baldwin | 345/506 |
| 2003/0103050 | A1* | 6/2003 | Lindholm et al. | 345/426 |
| 2004/0095348 | A1* | 5/2004 | Bleiweiss et al. | 345/419 |
| 2004/0168019 | A1* | 8/2004 | Barlow et al. | 711/105 |
| 2004/0237074 | A1 | 11/2004 | Aronson et al. | |
| 2005/0188178 | A1* | 8/2005 | Saida | 712/2 |
| 2006/0176309 | A1* | 8/2006 | Gadre et al. | 345/501 |
| 2007/0156253 | A1* | 7/2007 | De Silvio | 700/6 |
| 2008/0034357 | A1* | 2/2008 | Gschwind | 717/149 |
| 2008/0074433 | A1* | 3/2008 | Jiao et al. | 345/522 |
| 2008/0126745 | A1* | 5/2008 | Mejdrich et al. | 712/4 |
| 2008/0235316 | A1* | 9/2008 | Du et al. | 708/513 |
| 2009/0027407 | A1* | 1/2009 | Bourd et al. | 345/522 |
| 2009/0100252 | A1* | 4/2009 | Barlow et al. | 712/222 |

FOREIGN PATENT DOCUMENTS

JP 2007213522 A 8/2007

OTHER PUBLICATIONS

Taiwan Search Report—TW97137388-TIPO—Feb. 8, 2012.
Written Opinion—PCT/US2008/078006, International Search Authority, European Patent Office, Sep. 26, 2008.

* cited by examiner

*Primary Examiner* — Isaac Tecklu
(74) *Attorney, Agent, or Firm* — Matthew Evans; James R. Gambale, Jr.

(57) ABSTRACT

The present disclosure includes a shader compiler system and method. In an embodiment, a shader compiler includes a decoder to translate an instruction having a vector representation to a unified instruction representation. The shader compiler also includes an encoder to translate an instruction having a unified instruction representation to a processor executable instruction.

18 Claims, 4 Drawing Sheets

SHADER COMPILE SYSTEM AND METHOD

FIELD

The present disclosure is generally related to graphics processing.

DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Graphics processing units (GPUs) can improve graphics processing and multimedia application performance by processing data associated with a graphics pipeline. GPUs can execute programs, commonly referred to as shaders, that may supplement or replace stages of a default graphics pipeline. Shaders may manipulate vertex data or scalar data and may be written in high-level or low-level programming languages. Shader compilers process shader instructions to output executable code.

SUMMARY

In a particular embodiment, a shader compiler is disclosed. The shader compiler includes a decoder to translate an instruction having a vector representation to a unified instruction representation. The shader compiler also includes an encoder to translate an instruction having a unified instruction representation to a processor executable instruction.

In another particular embodiment, a method is disclosed that includes receiving a first instruction at a shader compiler, the first instruction having a vector representation. The method includes translating the first instruction to a unified instruction representation that includes both vector and scalar components. The method further includes generating output code including code derived from the unified instruction representation that is executable by a graphics processing unit.

In another particular embodiment, a portable device is disclosed that includes means for compiling a shader program using a unified instruction representation to generate a scalar output program. The portable device also includes means for executing the scalar output program.

In another particular embodiment, a processor readable medium is disclosed. The processor readable medium stores processor readable instructions to cause a processor to execute a method. The method includes receiving a first instruction at a shader compiler, the instruction having a vector representation. The method also includes translating the first instruction to a unified instruction representation, the unified instruction representation including both vector and scalar components. The method further includes generating an object file using the unified instruction representation, the object file including processor instructions that have a scalar representation.

One particular advantage provided by disclosed embodiments is a reduced compiler memory footprint due to a unified representation of vector and scalar instructions.

Other aspects, advantages, and features of the present disclosure will become apparent after review of the entire application, including the following sections: Brief Description of the Drawings, Detailed Description, and the Claims.

DETAILED DESCRIPTION

Figure 1:
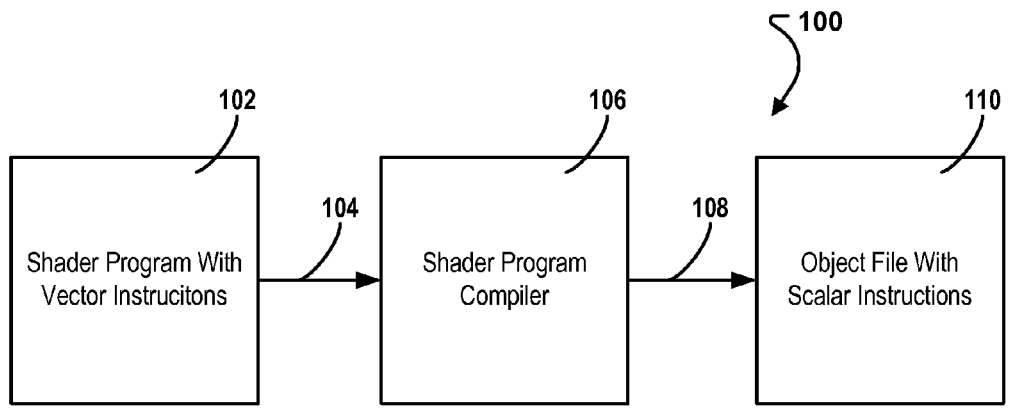
FIG. 1 is a functional diagram of a particular illustrative embodiment of a shader compiler system.

Referring to FIG. 1, a particular illustrative embodiment of a shader compiler system is depicted and generally designated 100. The system 100 includes a shader program with vector instructions 102, a shader program compiler 106, and an object file with scalar instructions 110. In a particular embodiment, the shader program with vector instructions 102, the shader program compiler 106, the object file 110, or any combination thereof, are stored in a memory of a computerized device, such as a personal computer or portable wireless device, that has a graphics processing unit (GPU).

The shader program with vector instructions 102 is input to the shader program compiler 106 via an input data stream 104. The shader program compiler 106 compiles the shader program 102 and writes via an output data stream 108 to the object file 110. The output data stream 108 may include instructions having a scalar format that are executable by a GPU.

In a particular embodiment, the shader program compiler 106 maps each instruction of the shader program with vector instructions 102 to a respective unified instruction representation for processing. Using the unified instruction representation, the shader program compiler 106 may generate compiled instructions having the unified instruction representation. The shader program compiler 106 may translate the compiled instructions from the unified instruction representation to a scalar representation that is executable by a GPU, and write the resultant scalar representation to the object file 110.

Use of a unified instruction representation for vector and scalar instructions may enable the shader program compiler 106 to operate with a smaller memory footprint than compilers that are configured to support both vector and scalar instructions independently. In addition, because the shader program compiler 106 operates using the unified instruction representation, the shader program compiler 106 is more easily revised to accommodate new shader programming languages and revisions to current shader specification standards, such as OpenGL.

Figure 2:
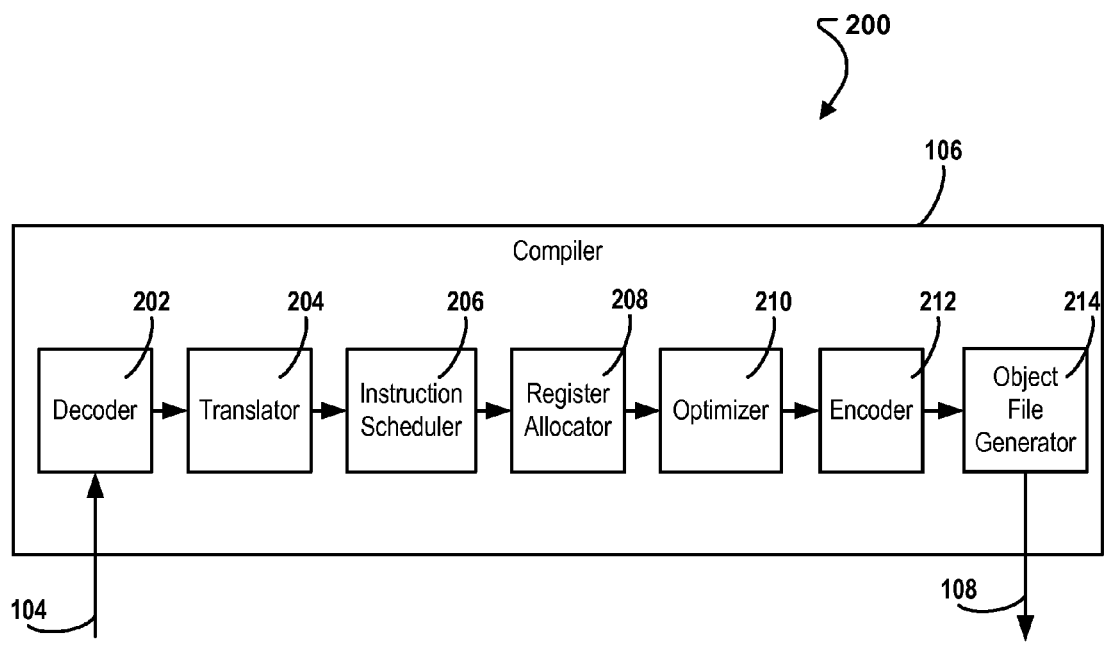
FIG. 2 is a functional diagram of a second illustrative embodiment of shader compiler system.

Referring to FIG. 2, a second illustrative embodiment of a compiler system is depicted and generally designated 200.

The system 200 includes the shader program compiler 106 configured to receive the input data stream 104 and to provide the output data stream 108, as illustrated in FIG. 1. The shader program compiler 106 includes a decoder 202, a translator 204, an instruction scheduler 206, a register allocator 208, an optimizer 210, an encoder 212, and an object file generator 214.

In a particular embodiment, the decoder 202 is configured to receive vector instructions and to map the vector instructions to a uniform storage representation. The decoder 202 may also be similarly configured to receive scalar instructions and to map the scalar instructions to the uniform scalar representation. Each of the translator 204, instruction scheduler 206, register allocator 208, optimizer 210, encoder 212, and object file generator 214 may be configured to perform its respective function using the unified instruction representation. In a particular embodiment, the encoder 212 may be configured to receive instructions in a unified instruction representation and to translate the instructions to a scalar instruction representation for output by the object file generator 214.

Figure 3:
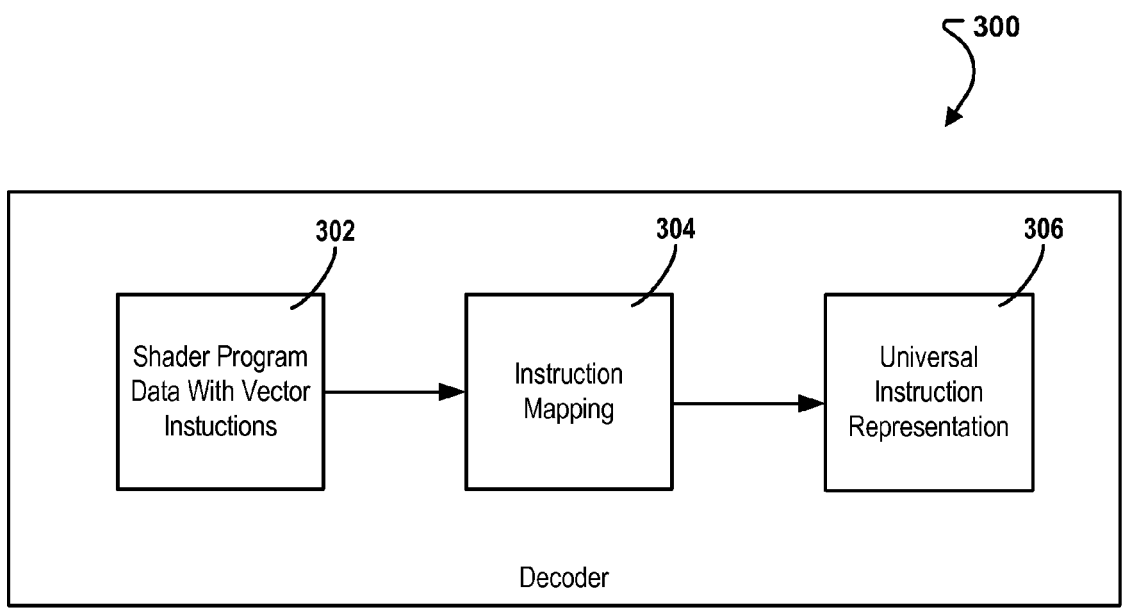
FIG. 3 is a functional diagram of a particular illustrative embodiment of a decoder that may be used in a shader compiler system.

Referring to FIG. 3, a particular embodiment of a decoder that may be used in a shader compiler system is depicted and generally designated 300. The decoder 300 is configured to provide shader program data with vector instructions 302 to an instruction mapping module 304. The instruction mapping module 304 is configured to output a representation of the shader program data using a universal instruction representation 306. In a particular embodiment, the decoder 300 may be used in a shader compiler, such as the shader program compiler 106 illustrated in FIGS. 1-2.

Vector instructions may be associated with different operations, operands, modifiers, and other properties than scalar instructions. Notably, vector and scalar instructions may have different operation codes, memory object types, constant types, destination modifiers, source modifiers, synchronization modes, swizzle modes, instruction compression schemes, lock modes, or any combination thereof. However, vector and scalar instructions may also have common attributes. A unified instruction representation that combines attributes of vector instructions and scalar instructions may enable a shader compiler to have a smaller static memory footprint by defining only a single instruction representation and eliminating redundancies that may arise from multiple instruction representations.

For example, both vector and scalar instructions may have addition, multiplication, sine, and cosine operations. Vector instructions may also have three-component dot product ("DP3"), "call," and "if" operations. Scalar instructions may not have DP3, call, and if operations, and may instead have a "branch" operation. A unified instruction representation may include addition, multiplication, sine, cosine, DP3, call, if, and branch operations to enable straightforward translation of vector and scalar instructions into the unified representation.

As another example, register types INPUT and OUTPUT may be specific to vector instructions, register type ADDRESS may be specific to scalar instructions, and register types TEMP and CONST may be common to both vector and scalar instructions. A unified instruction representation may therefore include register types INPUT, OUTPUT, ADDRESS, TEMP, and CONST. Similarly, attributes such as source swizzle mask may be specific to vector instructions, repeat number and branch target may be specific to scalar instructions, and operation code, register number, and destination write mask may be common to both vector and scalar instructions. A unified instruction representation that includes source swizzle mask, repeat number, branch target, operation code, register number, and destination write mask supports both vector instructions and scalar instructions while using a smaller total static memory footprint by removing redundancies in the combined vector instructions and scalar instructions.

As an illustrative, non-limiting example, for a certain attribute, vector instructions may have values from $\{C1, C2, \ldots, Cn, V1, V2, \ldots, Vm\}$, while scalar instructions may have values from $\{C1, C2, \ldots, Cn, S1, S2, \ldots, Sr\}$, where $C1 \ldots Cn$ are common to both scalar and vector instructions, $V1 \ldots Vm$ are specific to vector instructions, and $S1 \ldots Sr$ are specific to scalar instructions. Enumerated types for vector and scalar instructions, represented independently, may be defined:

enum T_VECTOR $\{C1, C2, \ldots, Cn, V1, V2, \ldots, Vm\}$;
enum T_SCALAR $\{C1, C2, \ldots, Cn, S1, S2, \ldots, Sr\}$;

Data structures for independent representation of vector instructions and scalar instructions may be defined:

```
            struct Instr_Vector
            {
            ...
            T_VECTOR member;
            ...
            };
            struct Instr_Scalar
            {
            ...
            T_SCALAR member;
            ...
            };
```

Operations on the data structures for independent representation may also be defined:
void operation_vector(Instr_Vector);
void operation_scalar(Instr_Scalar);

In contrast, in a particular embodiment, a unified instruction representation may define unified instruction representation enumerated type, data structure, and operations such as:

```
enum T_UIR {C1, C2,..., Cn, V1, V2,..., Vm, S1, S2, ..., Sr};
struct Instr_UIR
{
...
T_UIR member;
...
};
void operation_UIR(Instr_UIR);
```

Similarly, unified data types and structures may be defined:

```
            enum UIR_OPCODE
            {
            UIR_ADD,
            UIR_MUL,
            UIR_SIN,
            UIR_COS,
            UIR_DP3,
            UIR_CALL,
            UIR_IF,
            UIR_BRANCH,
            ...
            };
            enum UIR_OPERAND
            {
            UIR_TEMP,
            UIR_CONST,
```

```
        UIR_INPUT,
        UIR_OUTPUT,
        UIR_ADDRESS,
        ...
    };
    struct UIR_Operation
    {
        UIR_OPCODE        opcode;
        int               instruction_repeat_number;
        int               branch_target;
        ...
    };
    struct UIR_Operand
    {
        UIR_OPERAND       register_type;
        int               register_num;
        uint8             destination_write_mask;
        uint8             source_swizzle_mask;
        ...
    };
    struct UIR_Instruction
    {
        UIR_Operation     operation;
        UIR_Operand       *destination;
        UIR_Operand       **source;
        int               source_num;
        ...
    };
```

Subroutines for unified instruction representation may also be defined, for example:
void instr_self check(UIR_Instruction *instr);
UIR_Instruction* create_NOP(int repeat_num);
UIR_Instruction* copy_instruction(UIR_Instruction *old_instr);
void delete_instr(UIR_Instruction *instr);
UIR_Operand* copy_operand(UIR_Operand *old_operand);
void delete_operand(UIR_Operand *operand);
int get_source_swizzle(UIR_Operand *operand);

In addition to advantages demonstrated above, other advantages may be obtained by supporting vector and scalar instructions via a unified instruction representation in a shader compiler, including easier compiler development, verification, and maintenance, shorter development cycle, more stable operation, easier future upgrades, or any combination thereof For example, in addition to the compiler components 202-212 illustrated in FIG. 2, the unified instruction representation may be used by other compiler sub-modules such as modules for control flow graph construction, dependence graph construction, and Definition-Use and Use-Definition chain construction. Implementation of special instructions such as sampling instructions that appear in both vector space and scalar space are also simplified by use of a unified instruction representation.

Figure 4:
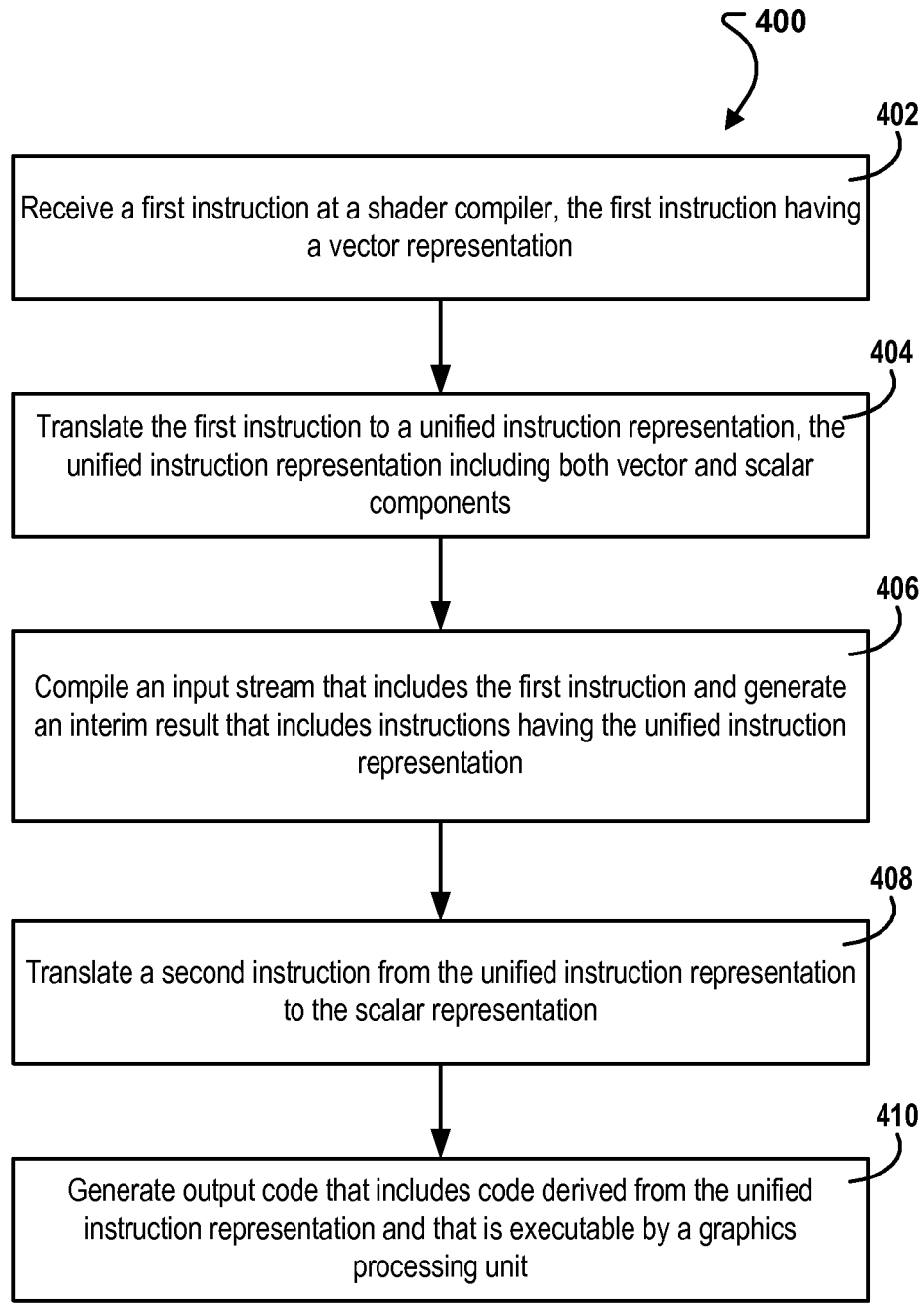
FIG. 4 is a flow chart of an embodiment of a shader compiler method.

Referring to FIG. 4, a particular illustrative embodiment of a shader compiler method is depicted and generally designated 400. A first instruction having a vector representation is received at a shader compiler, at 402. In a particular embodiment, the shader compiler may be a low-level compiler that is embedded in a memory of a computer device and configured to support runtime compilation of shader programs. In a particular embodiment, the shader compiler may be the shader program compiler 106 illustrated in FIGS. 1-2.

Advancing to 404, the first instruction is translated to a unified instruction representation. The unified instruction representation includes both vector and scalar components. Moving to 406, an input stream that includes the first instruction is compiled. Compiling is performed using the unified instruction representation and generating an interim result that includes instructions having the unified instruction representation.

Continuing to 408, a second instruction is translated from the unified instruction representation to the scalar representation. In a particular embodiment, the second instruction may have a scalar representation corresponding to the first instruction. Proceeding to 410, output code is generated that includes code derived from the unified instruction representation and that is executable by a graphics processing unit.

Figure 5:
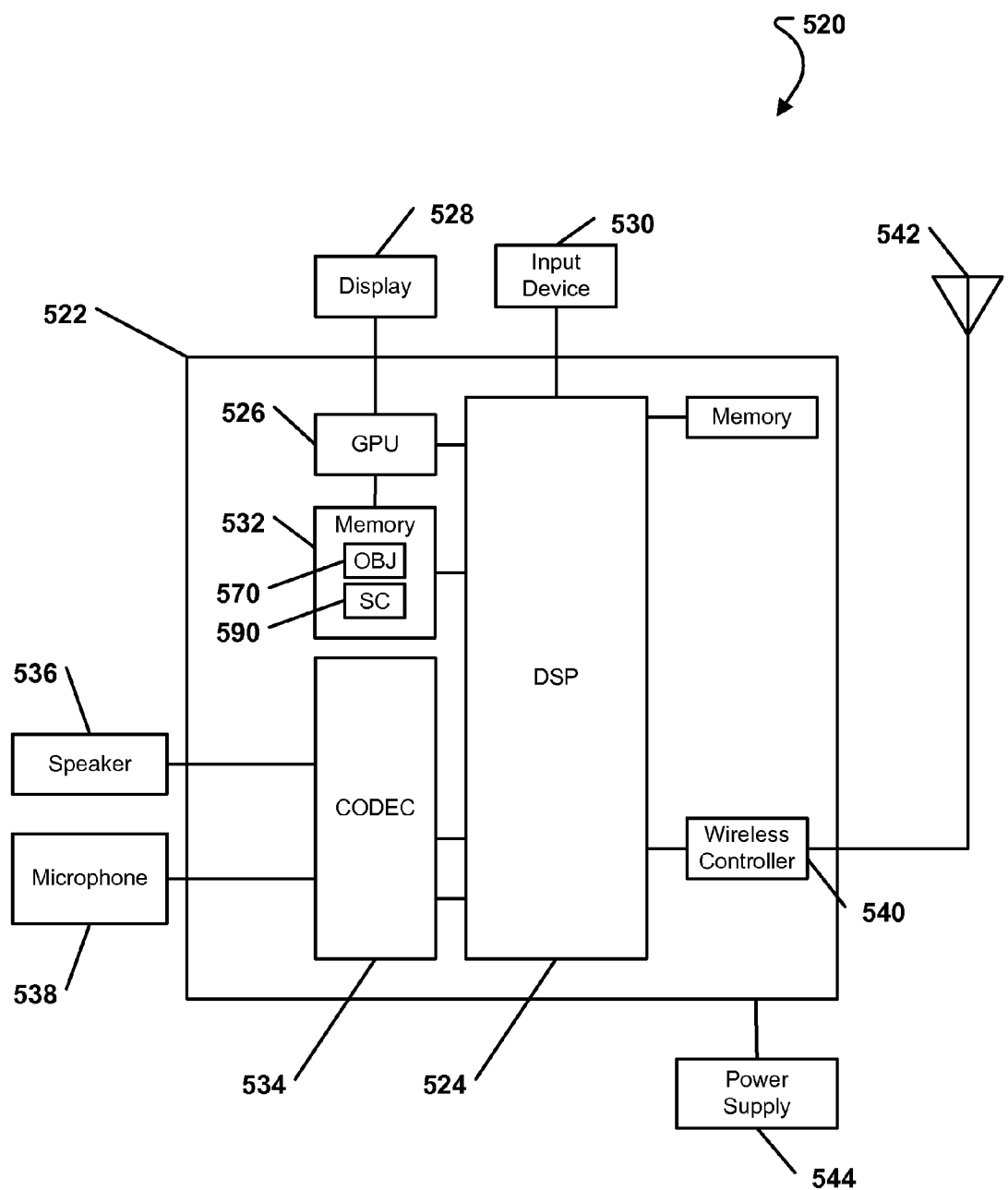
FIG. 5 is a block diagram of a portable communication device including a shader compiler system.

FIG. 5 illustrates an exemplary, non-limiting embodiment of a portable communication device that is generally designated 520. As illustrated in FIG. 5, the portable communication device includes an on-chip system 522 that includes a digital signal processor 524 and a graphics processing unit (GPU) 526. In a particular illustrative embodiment, the GPU 526 may be may be configured to execute one or more object files 570 stored at a memory 532. The one or more object files 570 may include compiled shader programs generated by a shader compiler 590, such as the shader program compiler 106 illustrated in FIGS. 1-2. The portable communication device 520 may be configured to receive shader source code, compiled shader files, or any combination thereof, via wireless transmission or other communication path from one or more remote sources.

FIG. 5 also shows that the GPU 526 is coupled to the digital signal processor 524 and a display 528. An input device 530 and the memory 532 are also coupled to the digital signal processor 524. Additionally, a coder/decoder (CODEC) 534 can be coupled to the digital signal processor 524. A speaker 536 and a microphone 538 can be coupled to the CODEC 534.

FIG. 5 also indicates that a wireless controller 540 can be coupled to the digital signal processor 524 and a wireless antenna 542. In a particular embodiment, a power supply 544 is coupled to the on-chip system 522. Moreover, in a particular embodiment, as illustrated in FIG. 5, the display 528, the input device 530, the speaker 536, the microphone 538, the wireless antenna 542, and the power supply 544 are external to the on-chip system 522. However, each is coupled to a component of the on-chip system 522.

In a particular embodiment, the digital signal processor 524 processes instructions associated with programs necessary to perform the functionality and operations needed by the various components of the portable communication device 520. For example, when a wireless communication session is established via the wireless antenna 542, a user can speak into the microphone 538. Electronic signals representing the user's voice can be sent to the CODEC 534 to be encoded. The digital signal processor 524 can perform data processing for the CODEC 534 to encode the electronic signals from the microphone. Further, incoming signals received via the wireless antenna 542 can be sent to the CODEC 534 by the wireless controller 540 to be decoded and sent to the speaker 536. The digital signal processor 524 can also perform data processing for the CODEC 534 when decoding the signal received via the antenna 542.

Further, before, during, or after the communication session, the digital signal processor 524 can process inputs that are received from the input device 530. For example, during the wireless communication session, a user may be using the input device 530 and the display 528 to surf the Internet via a web browser that is embedded within the memory 532 of the portable communication device 520. The digital signal processor 524 can interleave various program threads that are used by the input device 530, the GPU 526, the display 528, the CODEC 534 and the wireless controller 540, as described herein, to efficiently control the operation of the portable communication device 520 and the various components therein. Many of the instructions associated with the various program threads may be executed concurrently during one or more clock cycles. As such, the power and energy consumption due to wasted clock cycles is substantially decreased.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A device comprising:
   a processor operable to execute a shader compiler, wherein the shader compiler comprises:
   a decoder operable to translate a vector instruction to an instruction having a unified instruction representation;
   one or more components operable to process the instruction having the unified instruction representation using the unified instruction representation to generate a processed instruction, the processed instruction having the unified instruction representation; and
   an encoder operable to translate the processed instruction having the unified instruction representation to a processor executable instruction, wherein the unified instruction representation includes both vector and scalar attributes wherein the attributes of the unified instruction representation include at least one attribute common to both the vector instructions and scalar instructions.

2. The device of claim 1, wherein the processor executable instruction has a scalar representation.

3. The device of claim 1, wherein the at least one attribute includes at least one of an addition operation, a multiplication operation, a sine operation, and a cosine operation.

4. The device of claim 1, wherein the at least one attribute includes at least one of an operation code, a register number, and a destination write mask.

5. The device of claim 1, wherein the instruction having the unified instruction representation requires less static memory than the static memory required to store corresponding vector instructions and scalar instructions.

6. The device of claim 1, wherein the unified instruction representation supports at least one vector instruction register type and at least one scalar instruction register type.

7. The device of claim 1, wherein the decoder is configured to receive low level shader source code.

8. A method comprising:
   receiving a first instruction at a shader compiler executing on a processor, the first instruction having a vector instruction;
   translating, with the shader compiler executing on the processor, the first instruction to a unified instruction representation, the unified instruction representation including both vector and scalar attributes;
   processing, with the shader compiler executing on the processor, the first instruction using the unified instruction representation to generate a processed instruction, the processed instruction having the unified instruction representation; and
   generating, with the shader compiler executing on the processor, output code that is executable by a graphics processing unit, wherein the output code includes code derived from the processed instruction having the unified instruction representation wherein the attributes of the unified instruction representation include at least one attribute common to both the vector instructions and scalar instructions.

9. The method of claim 8, wherein the output code includes at least a second instruction having a scalar instruction corresponding to the first instruction.

10. The method of claim 9, further comprising translating at least the second instruction from the unified instruction representation to the scalar instruction.

11. A portable device, comprising:
    means for compiling a shader program to translate a vector instruction, of the shader program, to an instruction having a unified instruction representation, to process the instruction using the unified instruction representation to generate a processed instruction, the processed instruction having the unified instruction representation, and to translate the processed instruction having the unified instruction representation to a scalar output program, wherein the unified instruction representation includes both vector and scalar attributes; and
    means for executing the scalar output program with a graphics processing unit wherein the attributes of the unified instruction representation include at least one attribute common to both the vector instructions and scalar instructions.

12. The portable device of claim 11, further comprising:
    a processor; and
    a memory coupled to the processor,
    wherein the means for compiling the shader program includes a shader compiler that is stored at the memory and executable by the processor.

13. The portable device of claim 12, wherein the scalar output program includes an object file that is stored in the memory.

14. The portable device of claim 13, further comprising wireless data communication means to receive uncompiled shader code from a remote location.

15. The device of claim 11, wherein the instruction having the unified instruction representation requires less static memory than the static memory required to store corresponding vector instructions and scalar instructions.

16. A non-transitory processor readable medium having processor readable instructions to cause a processor to:
receive a first instruction at a shader compiler executing on the processor, the first instruction having a vector instruction;
translate, with the shader compiler executing on the processor, the first instruction to a unified instruction representation, the unified instruction representation including both vector and scalar attributes;
process, with the shader compiler executing on the processor, the first instruction using the unified instruction representation to generate a processed instruction, the processed instruction having the unified instruction representation; and
generate, with the shader compiler executing on the processor, an object file using the unified instruction representation, the object file including processor instructions derived from the processed instruction-having the unified instruction representation wherein the attributes of the unified instruction representation include at least one attribute common to both the vector instructions and scalar instructions.

17. The non-transitory processor readable medium of claim 16, wherein the first instruction is a low-level vector instruction corresponding to an OpenGL specification.

18. The non-transitory processor readable medium of claim 16, further comprising instructions to translate at least one instruction from the unified instruction representation to a scalar instruction representation.

* * * * *